No. 751,483. PATENTED FEB. 9, 1904.
T. J. DYE.
RAILWAY RAIL JOINT.
APPLICATION FILED JULY 22, 1903.
NO MODEL.
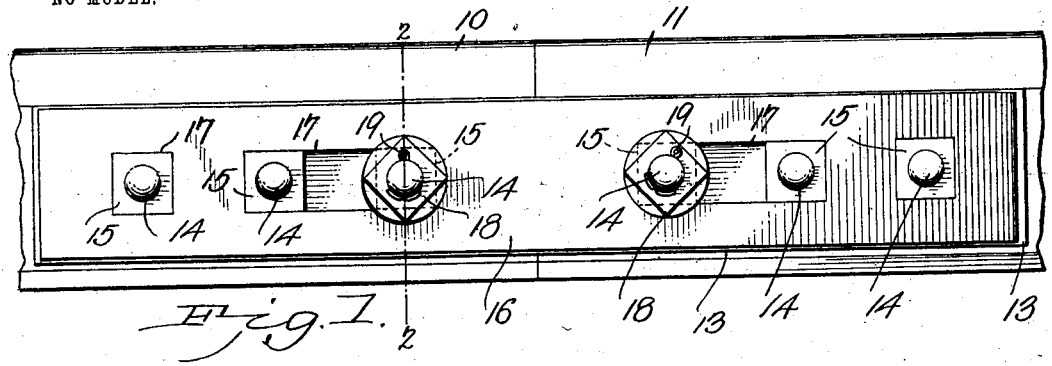
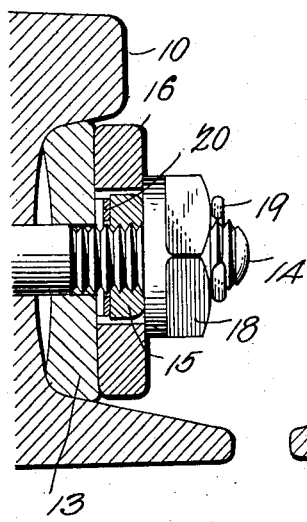
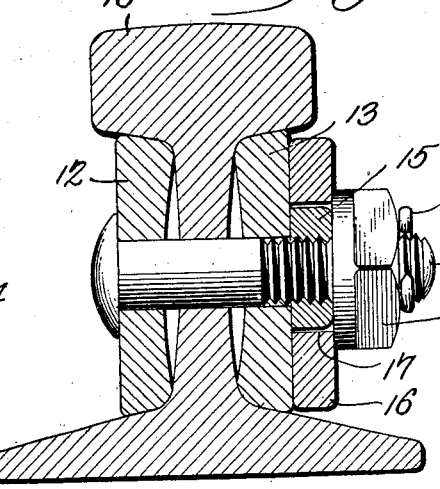
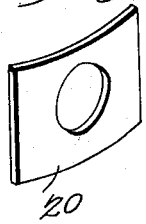
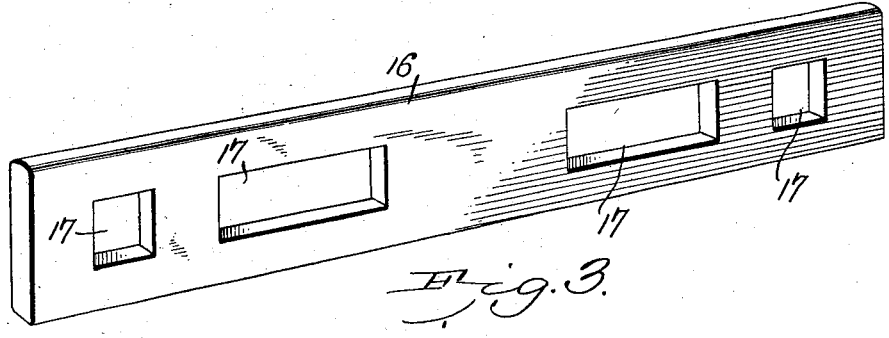
Witnesses
T. J. Dye, Inventor.
by C. A. Snow & Co
Attorneys No. 751,483.

Patented February 9, 1904.

UNITED STATES PATENT OFFICE.

THOMAS JEFFERSON DYE, OF GLOSTER, MISSISSIPPI, ASSIGNOR OF ONE-FOURTH TO JOHN H. HINES, OF GLOSTER, MISSISSIPPI.

RAILWAY-RAIL JOINT.

SPECIFICATION forming part of Letters Patent No. 751,483, dated February 9, 1904.

Application filed July 22, 1903. Serial No. 166,631. (No model.)

*To all whom it may concern:*

Be it known that I, THOMAS JEFFERSON DYE, a citizen of the United States, residing at Gloster, in the county of Amite and State of Mississippi, have invented a new and useful Railway-Rail Joint, of which the following is a specification.

This invention relates to railway-rail joints of the class wherein means are provided for locking the nuts of the clamp-bolts and preventing them from turning backward or becoming loosened thereon, and has for its object to simplify and improve devices of this character and increase the efficiency without increase of expense or complication of parts; and the invention consists in certain novel features of construction, as hereinafter shown and described, and specified in the claim.

In the drawings illustrative of the invention, in which corresponding parts are denoted by like designating characters, Figure 1 is a side elevation of a railway-rail joint with the improvement applied. Fig. 2 is a transverse section on the line 2 2 of Fig. 1. Fig. 3 is a perspective view of the lock-plate detached. Fig. 4 is a sectional view showing the employment of a spring locking-plate in connection with each of the bolts and nuts. Fig. 5 is a detail perspective view of the locking-plate.

The improved device may be applied for locking nuts in many forms of structures, but is more particularly applicable to those employed upon railway-rail joints, as shown in the drawings, in which 10 11 represent the abutting ends of two rails, with the clamp-plates 12 13 engaging opposite sides of the vertical webs of the rails, the clamp-plates having the usual registering transverse apertures to receive the threaded clamp-bolts 14, the latter having the clamp-nuts 15, as shown. One or more of the clamp-bolts are extended at the threaded end, and each extended end is provided with a transverse aperture. Engaging the outer face of clamp-plate 13 is a lock-plate 16, having spaced apertures 17, adapted to engage the nuts 15 and prevent them from turning upon the bolts. The apertures 17 may be elongated to embrace two or more of the nuts or large enough to embrace one nut only, as may be required; but preferably the apertures next the ends of the plate will be formed to embrace single nuts and the intermediate apertures formed to each embrace two of the nuts, as shown in Fig. 1. The extended bolts 14 are intended to receive binding-nuts 18 in advance of the plate 16 and with the outer portions of the binding-nuts projecting over the contiguous surface of the lock-plate, and thus form a means for holding the lock-plate in position upon the clamp-plate 13 and over the nuts 15, as shown. By this simple means the nuts 15 will be securely locked in position and effectually prevented from rotating backward upon the bolts or becoming loosened by the severe jarring strains to which the nuts of railway-rail joints are subjected.

To prevent any possibility of the binding-nuts 18 becoming loosened, spring-keys 19 will be inserted through the apertures in the extended bolt ends, as shown, and projecting over the outer faces of the binder-nuts 18, as shown. This is an important feature of the invention and adds materially to its value and efficiency.

The device may be applied to all the various sizes and forms of railway-rails and their joints and also to other structures in which simple and positive nut-locking devices are required.

In order to provide for expansion and contraction due to the thermal changes, each of the bolts carries a spring 20 in the form of a rectangular plate. This spring-plate is slightly bowed and is placed directly under each of the nuts.

The spring-plates 20 enable the nuts 15 to be screwed up into firm contact with the springs, so as to prevent rattling of the plates 13 against the rails and at the same time permit the expansion of the parts without any loosening of the plates 13.

Having thus described the invention, I claim—

In a rail-joint, the combination with the abutting rail ends having bolt-holes, of clamp-plates having corresponding bolt-holes, threaded clamp-bolts located in said bolt-holes and provided with nuts, spring-plates on said bolts between said nuts and the adjacent clamping-plates, a lock-plate having spaced apertures engaging said nuts, and binding-nuts on the ends of the bolts engaging the contiguous surface of the lock-plate, and means provided in the bolt ends for locking the nuts engaging the lock-plate.

In testimony that I claim the foregoing as my own I have hereto affixed my signature in the presence of two witnesses.

THOMAS JEFFERSON DYE.

Witnesses:
C. ADAMS,
W. D. JOHNS.